Sept. 29, 1970    W. W. MALCOLM ETAL    3,531,750
VARIABLE RELUCTANCE POSITION TRANSDUCER
Original Filed April 8, 1966
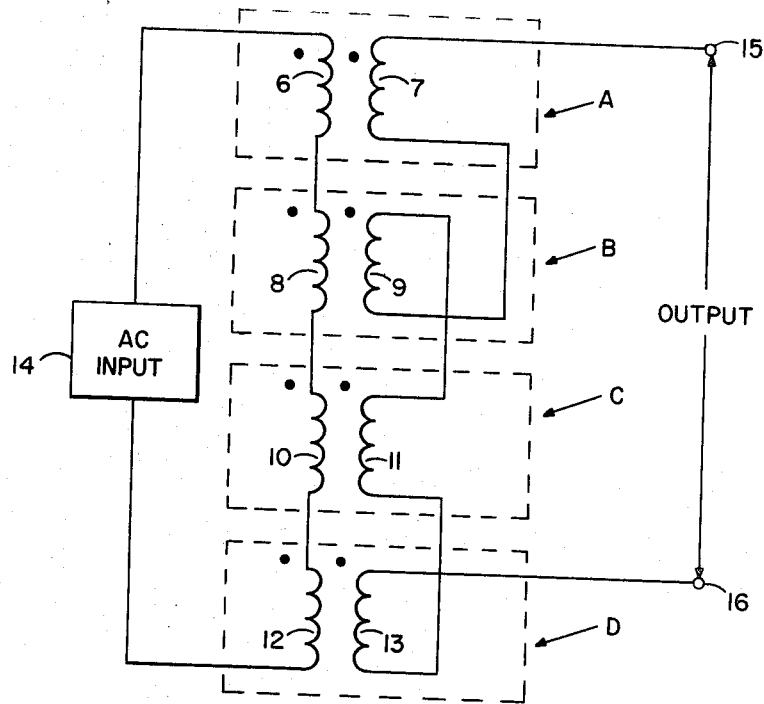
FIG. 1
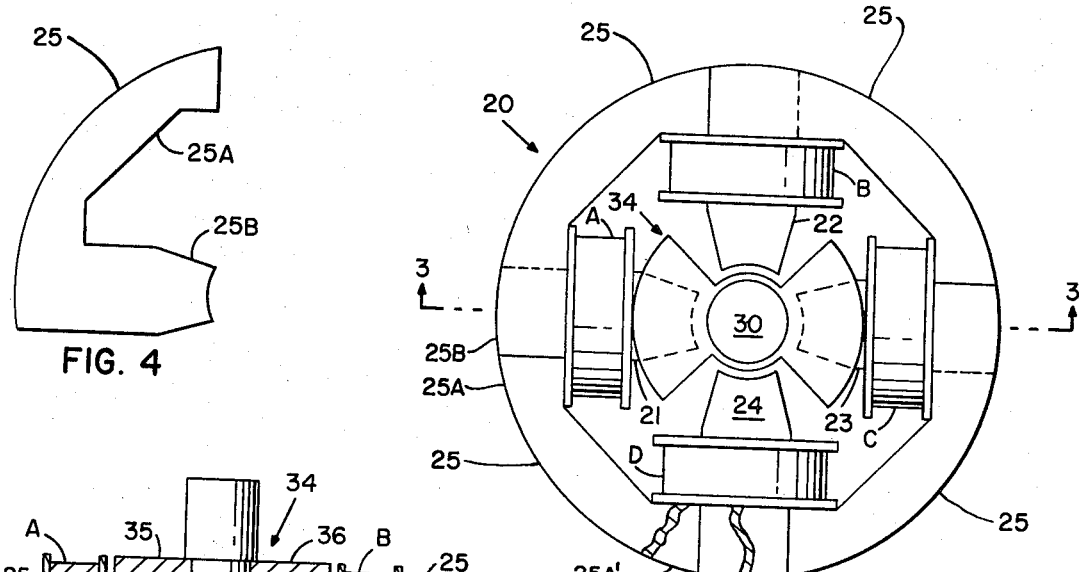
FIG. 4
FIG. 2
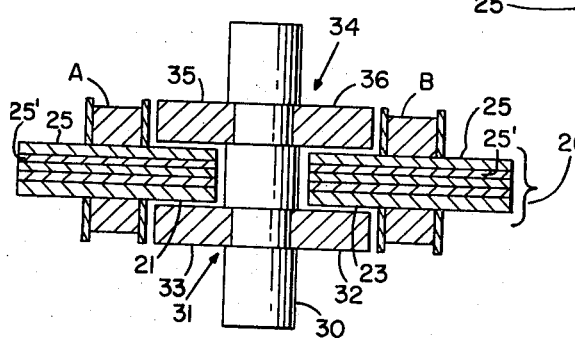
FIG. 3
William W. Malcolm
Richard L. Moore,
INVENTORS.
BY United States Patent Office 3,531,750
Patented Sept. 29, 1970

3,531,750
VARIABLE RELUCTANCE POSITION TRANSDUCER
William W. Malcolm, Huntsville, Ala., and Richard L. Moore, Richardson, Tex., assignors, by direct and mesne assignments, to the United States of America as represented by the Secretary of the Army
Original application Apr. 8, 1966, Ser. No. 541,395, now Patent No. 3,483,613, dated Dec. 16, 1969. Divided and this application Oct. 1, 1968, Ser. No. 798,231
Int. Cl. H01f 21/06
U.S. Cl. 336—135                                1 Claim

ABSTRACT OF THE DISCLOSURE

The invention includes a four pole stator composed of a plurality of laminations. Each lamination has a pole portion and an annular portion. The pole portions carry primary and secondary windings. A unitary rotor is located adjacent the poles and varies the coupling between the windings in accord with its angular position. An AC signal applied to series connected primary windings appears at the output of series connected record windings. The secondary windings are wound in alternate bucking pairs.

---

The invention described herein may be manufactured and used by or for the Government for governmental purposes without the payment of any royalty thereon.

This application is a division of applicants' copending application Ser. No. 541,395, filed Apr. 8, 1966, now Pat. No. 3,483,613.

This invention relates to an improved shaft angular position variable reluctance pickup transducer. A linear analog voltage with respect to shaft angle is obtained over a greater angle than with prior art devices, and a more compact device is obtained than the prior art devices, for a given output.

Heretofore, it has been difficult to obtain a linear voltage output from a transducer responding to an angular shaft position except over a small angle. Typical, known microsyns are only linear over relatively small angles, such as ±15° from a median shaft position, while the invention is linear over ±25°. Moreover, the instant device obtains this linearity with a reduction in size of the device, because of the method by which the device is made.

An object of the invention is to provide an improved shaft angle to voltage transducer.

Another object is to provide a method whereby such a transducer may be fabricated.

Yet another object is to provide a shaft angle to voltage transducer which is simple in construction and which permits relatively wide manufacturing tolerances.

Briefly, the invention consists of a four pole stator of magnetic material having a primary and a secondary winding on each pole and with an armature of magnetic material carried by a shaft rotatable to vary the coupling between the primary and secondary windings on each pole when an AC signal is applied to the respective primary windings. The secondary windings are connected in series in a manner to give an output whose phase and amplitude is indicative of the angular position of the armature shaft.

The stator consists of a plurality of laminations, each lamination comprising a quarter section of the overall outline of the stator. These laminations each have a pole section and an annular section on one side of the pole section. The pole sections are inserted into stator windings with alternate laminations having their annular sections oppositely disposed to each other. The windings plus laminations assemblies are then mated together by interleaving the annular sections of the laminations. Before the final assembly is mated, the armature is inserted amongst the other assemblies. The final assembly is then mated and the armature is surrounded by the stator.

The outermost laminations of the stator are made appreciably thicker than the remainder of the laminations in order to impart structural rigidity thereto.

The invention may be best understood by reference to the drawings, in which the same numerals are used for the same elements in the different figures and in which:

FIG. 1 is a schematic diagram of the circuit of the invention,

FIG. 2 shows the physical embodiment of the invention with the windings in place on the stator.

FIG. 3 is a sectional view in the direction of the section line 3—3 of FIG. 2, and FIG. 4 shows the shape of one of the stator laminations.

Referring now to FIG. 1, the dotted line rectangles A, B, C and D are used to show which of the various windings 6–13 are mounted on the poles of the stator 20 of FIG. 2. Windings 6, 8, 10 and 12 are connected in series with an AC source 14 and windings 7, 9, 11 and 13 are series connected with windings 9 and 13 connected to buck windings 7 and 11. Terminals 15 and 16 are the output terminals of the device.

Referring to FIG. 2, the assembled stator 20 has four poles 21, 22, 23 and 24. The stator is composed of a plurality of segmental laminations 25, of the shape as shown in FIG. 4. Coils A, B, C and D are respectively carried by poles 21, 22, 23 and 24. Coil A consists of windings 6 and 7 (FIG. 11), coil B consists of windings 8 and 9 coil C consists of windings 10 and 11 and coil D consists of windings 12 and 13. The rotor is seen to consist of a shaft 30 having two armatures 31 and 34 thereon of which armature 34 can be seen in FIG. 2.

Referring to FIG. 3, armature 31 includes two ninety degree sectors 32 and 33 and armature 34 has two ninety degree sectors 35 and 36. In use, shaft 30 is surrounded by poles 21, 22, 23 and 24 with armatures 31 and 34 on opposite sides of stator 20 and closely spaced from poles 21–24. The rotor is machined from a single piece of metal and is consequently of uniform magnetic properties throughout.

Assembly of stator

Referring to FIG. 4, each lamination consists of an annular portion 25A and a pole portion 25B. The pole portion 25B is inserted into a coil, such as B. Additional laminations are inserted until the coil is filled. Alternate laminations are inserted so that the portions 25A are oppositely disposed to each other. When the laminations for each coil have been inserted, the annular portions 25A of the laminations are interleaved, those laminations associated with coil B being interleaved with those of coils A and C, those of coil A being interleaved with those of coils B, D, etc. Before the final set of laminations are interleaved, rotor 31 is placed in position among the coils.

The advantages of this type of assembly are two-fold. Firstly, this type of assembly allows larger coils to be used than if the stator laminations were not of the sectional type as shown, but were in the form of the assembled stator as shown. Secondly, the rotor can be much larger than would be possible if the rotor had to be inserted through the opening between the poles. It would obviously be possible to employ a rotor composed of several parts and press the parts together on either side of the poles, but the advantage of a single piece rotor would not be obtained. The making of the rotor of a single piece of metal avoids magnetic anomalies that might be present in a built up rotor, and insures accurate parts alignment. The use of large coils on the pole pieces allows a greater voltage output to be obtained than with a standard assembly. In practice, it is possible to use a smaller transducer than a prior art transducer, for a given output. The rotor of the invention also allows the transducer to have a linear output over a greater angular range than prior art transducers. The linear range of a typical prior art transducer is ±15°. Such a typical transducer is the microsyn signal generator produced by the Elipse-Pioneer Division of Bendix Corporation and designated HA6–A1. The transducer of the invention has a linear range of ±25°.

Operation of the circuit of the transducer

An AC input 14 is connected to the series connected windings 6, 8, 10 and 12. An AC voltage is induced in each of the windings 7, 9, 11 and 13 by the respective windings 6, 8, 10 and 12. The magnitude of the induced voltages in each of windings 7, 9, 11 and 13 is related to the angular position of shaft 30 and armatures 31 and 34 because of the variations in the amount of coupling between the windings on a pole by the varying amount of magnetic material of the rotor adjacent thereto. Since windings 9 and 13 are connected in a bucking relationship to windings 7 and 11, a null condition or zero output would be obtained with the rotor forty-five degrees (clockwise or counterclockwise) from the position shown in FIG. 2. In such a position, the voltage on each of coils 7, 9, 11 and 13 would be the same and there would be a value of zero between points 15 and 16. With the rotor in the position as shown in FIG. 2, a maximum voltage would be obtained from windings 7 and 11 and a minimum voltage from windings 9 and 13, and a voltage would be present on terminals 15 and 16. With the rotor turned ninety degrees from the position as shown in FIG. 2, a maximum voltage would be obtained from windings 9 and 13 and the voltage at points 15 and 16 would be the same as that with the rotor in the position of FIG. 2, but one hundred and eight degrees phase shifted. Thus, the amplitude and phase of the output at terminals 15 and 16 would be dependent respectively on the angle and direction of rotation of the rotor.

The output at terminals 15 and 16 may be put to various uses or connected to various loads. The output voltage of the invention may be applied to one set of deflection plates of a cathode-ray oscilloscope with the AC input to the invention connected to the other set of deflection plates. The resulting Lissajous figures would be indicative of the angular position of shaft 30. Alternatively, the output at terminals 15 and 16 could be used to control servomechanisms to repeat the angular position of shaft 30 or operate recording means to record the angular position of shaft 30.

While a specific embodiment of the invention has been described, other embodiments may be obvious to one skilled in the art, in light of the present disclosure.

We claim:

1. An electromagnetic device having a multipole stator composed of a plurality of laminations, each of said laminations having a pole portion and an annular portion on at least one side of said pole portion, at least one electrical winding for each pole of said stator, with a plurality of said laminations in each of said windings and with alternate laminations oppositely disposed to each other, and with the annular portions of laminations of the different windings interleaved, said device including a rotor, said rotor being a single integral piece of magnetic material and including an axial shaft portion and two axially displaced sectors, one on each side of the poles of said stator.

References Cited

UNITED STATES PATENTS

| 1,756,672 | 4/1930 | Barr | 310—217 XR |
| 1,779,950 | 10/1930 | Reichel | 310—217 XR |
| 2,464,320 | 3/1949 | Klinkhamer | 310—259 |
| 2,774,000 | 12/1956 | Ross | 310—217 XR |
| 2,920,296 | 1/1960 | Neurath | 336—210 XR |
| 3,105,212 | 9/1963 | Schwartz | 336—135 XR |
| 3,192,495 | 6/1965 | Brodersen | 336—135 |

FOREIGN PATENTS

| 983,633 | 2/1965 | Great Britain. |
| 1,100,589 | 1/1968 | Great Britain. |

THOMAS J. KOZMA, Primary Examiner

U.S. Cl. X.R.

336—217, 234